United States Patent [19]

DeVries

[11] Patent Number: 5,360,645
[45] Date of Patent: Nov. 1, 1994

[54] APPARATUS AND METHOD FOR COATING A MATERIAL ONTO A PLANAR SUBSTRATE

[75] Inventor: James E. DeVries, North Olmsted, Ohio

[73] Assignee: Nordson Corporation, Westlake, Ohio

[21] Appl. No.: 997,355

[22] Filed: Dec. 28, 1992

[51] Int. Cl.$^5$ ............................................. B05D 1/02
[52] U.S. Cl. ................................. 427/421; 427/110; 427/163; 427/168; 427/210; 427/284; 427/287; 427/424; 427/163.2; 118/316
[58] Field of Search ............... 427/421, 424, 284, 287, 427/110, 168, 163, 210; 118/316

[56] References Cited

U.S. PATENT DOCUMENTS

| | | | |
|---|---|---|---|
| 4,348,432 | 9/1982 | Huang | 427/424 |
| 4,753,819 | 6/1988 | Shimada | 427/96 |
| 4,857,367 | 8/1989 | Thorn et al. | 427/348 |
| 4,880,663 | 11/1989 | Shimada | 427/96 |
| 5,017,409 | 5/1991 | Bok | 427/424 |
| 5,049,368 | 9/1991 | Turner, Jr. | 427/424 |
| 5,131,349 | 7/1992 | Keller et al. | 118/73 |

*Primary Examiner*—Shrive Beck
*Assistant Examiner*—David M. Maiorana
*Attorney, Agent, or Firm*—Raymond J. Slattery, III; Roger D. Emerson

[57] ABSTRACT

An apparatus and method for conformally coating an associated generally planar substrate such as vehicle window glass with a coating material includes first (12), second (22), and third (32) coating guns. The first (12) and second (22) coating guns are aimed at opposite sides (42; 44) of the planar substrate and can simultaneously spray a coating thereon. The third coating gun (32) is aimed toward a third side (46), or edge, of the associated substrate. Therefore, the apparatus can simultaneously spray a coating material on target areas on opposite sides and an included edge of a planar substrate such as a vehicle windshield. The third coating gun has an axis which makes an angle $\alpha$ with a plane containing the substrate to be sprayed. The first and second guns are offset from each other a distance "X", so that overspray from one gun will not foul or coat the other gun.

9 Claims, 3 Drawing Sheets

APPARATUS AND METHOD FOR COATING A MATERIAL ONTO A PLANAR SUBSTRATE

BACKGROUND OF THE INVENTION

1. Field of Invention

This invention pertains to the art of apparatuses and methods of dispensing a coating material onto a surface, and more particularly to apparatuses and methods of conformally coating liquid primers and sealants onto substrates such as vehicle window glass, such as, side glass and windshields.

2. Description of the Related Art

In a wide variety of businesses and manufacturing operations, it is often desirable for an apparatus to dispense a coating material in a specific target area on a substrate. This operation is typically carried out in an automatic manner in order to speed manufacturing, reduce costs, and improve accuracy. One current application of such apparatuses and methods is the coating of an edge of a vehicle side glass prior to encapsulation, such as in reaction injection molding.

The operation of fitting and joining a windshield or other glass component to the associated vehicle body flange is an important part of the vehicle manufacturing process. Vehicles must successfully pass a federal test which measures the vehicle's ability to retain the windshield under various conditions.

In order to manufacture a windshield which can successfully pass this test, the windshield must undergo a number of important manufacturing operations. Manufacturers of glass windshields provide an area around the marginal edge of the windshield which is appropriate for bonding to the vehicle body flange. In some embodiments, this marginal area is covered with a black, ceramic frit.

When the windshield is to be fitted and joined to the associated body flange of the vehicle, a clear glass primer is applied to the marginal edge. This clear glass primer can be applied in several ways. Some methods include a wet brush, a felt wick, spraying or other application technique.

After the clear primer is applied, a coat of black glass primer is often applied. The black glass primer has certain qualities which are advantageous, such as protection against ultraviolet rays from the sun.

Application of these two coats of primer has historically been a labor intensive and expensive process. Some problems encountered include an inability to easily determine what areas of the marginal edge of the windshield have received the clear primer. Since it is clear, spraying tends to be difficult to see. However, since any portion of the marginal edge which does not receive the primer can result in a weak spot, it is important to ensure that the entire marginal edge receives the proper coating of clear primer.

Another problem faced in the prior art is the misapplication of black primer. Especially in cases of non-automatic, manual application, black primer dripped onto areas of the windshield other than the marginal edge can result in a defect which must be repaired.

Efforts by some in the art have sought to eliminate these problems by improvements to the apparatuses or methods of application.

For example, one such method and apparatus is disclosed in U.S. Pat. No. 4,857,367 to Thorn et al. in which the method and apparatus for spray coating an edge of a surface utilizes an air nozzle and an air curtain. The liquid nozzle sprays atomized black primer onto the edge of a windshield. The air nozzle is designed to withdraw airborne black primer particles from spray area. In such case, the possibility exists for some airborne spray particles to escape the air curtain and contaminate parts of the substrate upon which no spray coating is desired. Overspray from atomized spray apparatus is difficult to control and there is always the possibility for overspray to other areas of the windshield. Further, Thorn et al. discloses the use of the method and apparatus in coating only one surface of a substrate at a time, therefore requiring two passes of the substrate past the apparatus in order to coat both sides of the substrate.

A method of airless, non-atomizing coating is disclosed in the U.S. Pat. No. 5,049,368 to Turner and in U.S. Pat. Nos. 4,753,819 and 4,880,663, both to Shimada, which are all owned by the same assignee as this invention, and the disclosures of which are incorporated herein by reference in their entireties. In an air spraying application, a stream of spray material is impacted by separate streams of air to atomize the material for deposit onto the substrate. One of the problems with air spraying is that there is no distinct boundary to the fine mist of atomized spray particles. As such, the substrate must be masked or otherwise protected to avoid overspray from damaging other areas of the windshield. However, in airless coating techniques as disclosed in the above-referenced patents, flat pattern, airless, non-atomizing coating nozzles provide uniform, splashless dispensing within close tolerances.

The above prior art has been devoted only to single sided coatings of vehicle windshields. New advancements in the art of manufacturing side glass components, such as in the encapsulation of the peripheral edge of the glass, require priming of multiple sides of the glass. Single pass priming of the vehicle side glass suffers from the problems associated with the priming of the windshields. Therefore, further improvements in priming vehicle window glass are desirable.

SUMMARY OF THE INVENTION

The present invention contemplates an apparatus for conformally coating an associated substrate such as vehicle window glass with a coating material. The substrate has first and second opposite sides and lies generally in a plane. A first coating gun is aimed at a first target area on a first side of the substrate. A second coating gun is aimed at a second target area on the second side of the substrate. The first and second sides of the substrate are opposite and as relative movement between the first and second coating guns and the substrate occurs, the target areas on both the first and second side of the substrate are simultaneously conformally coated. For purposes of this disclosure, a first side of the substrate is said to be "opposite" a second side of the substrate if said first and second sides lie in generally parallel planes and are separated by an edge, which is the thickness of the substrate. Sides of the substrate are "different" if they are not coplanar.

According to another embodiment of the invention, the first gun is offset from the second gun a certain distance which is measured as the shortest distance between the centerlines of the dispensing orifices of the first and second coating guns. This offset is effective to prevent overspray from one gun from spraying, coating, or otherwise fouling the second gun. According to a still further embodiment of the invention, the apparatus comprises a first and second coating gun which can be configured so that one side and an edge can be simultaneously conformally coated. The edge is within a plane which is generally perpendicular to a plane containing the first side.

According to a still further embodiment of the invention, the apparatus comprises a third coating gun which is oriented to make an angle α with the plane of the substrate. The third coating gun is effective to coat the third side of the substrate, the third side often forming an edge between the first side and second side. In this embodiment, therefore, two opposite sides and an included edge of an substrate can be simultaneously conformally coated.

According to a still further embodiment of the invention, the apparatus may comprise either the first or the second coating gun in conjunction with the third coating gun for coating the first and third sides or for coating the second and third sides simultaneously.

According to a still further aspect of the invention, a method of simultaneously conformally coating more than one side of vehicle window glass with a coating material comprises the steps of:

supplying a coating material to a first coating gun, the first coating gun being aimed at a first target area on the first side of the window glass:

supplying a coating material to a second coating gun, the second coating gun being aimed at a second target area on a second and opposite side of the window glass;

supplying a coating material to a third coating gun, the third being aimed at a third side of the window glass, the third side of the window glass being between the first and second sides of the window glass forming an edge therebetween;

controlling a supply pressure of said coating material to the first, second, and third coating guns so that a liquid film emission is discharged from the coating guns, the liquid film emission being substantially free atomized particles of the coating material; and, producing movement of the window glass relative to the first, second, and third coating guns so that coating material dispensed from the first second, and third coating guns continuously and simultaneously conformally coats the target areas of the first, second, and third sides of the window glass.

One advantage of the present invention is the provision of a new improved method and apparatus of conformally coating more than one side of a planar substrate.

Another advantage of the present invention is the provision of a first and second coating gun so that opposite sides of a planar substrate, such as a vehicle windshield, can be simultaneously conformally coated. This substantially reduces the processing time within the manufacturing process, thereby reducing costs.

A further advantage of the invention is the elimination of the need to invert the planar substrate in order for both sides to be coated. One common application of the process is the conformal coating of target areas on opposites sides of a vehicle windshield. In the prior art, this process required turning the vehicle windshield over. This process was time consuming, costly, and could lead to breakage should the windshield be dropped.

A further benefit and advantage of the invention is the improved edge definition possible through the use of the preferred nozzles and preferred conformal coating method. The method has successfully been used when holding the edge definition to very tight tolerances and excellent results have been obtained through the process by applying the preferred method and apparatus to the vehicle windshield application.

Still further benefits and advantages of the invention will be apparent to those skilled in the art to which it pertains upon the reading and understanding of the following detailed specification and description.

DESCRIPTION OF THE DRAWINGS

The invention will take form in certain parts and arrangements of parts. The preferred embodiment will be described in detail and will be illustrated in the following drawings which form a part of this disclosure and wherein.

DETAILED DESCRIPTION OF THE PREFERRED EMBODIMENT

Figure 1:
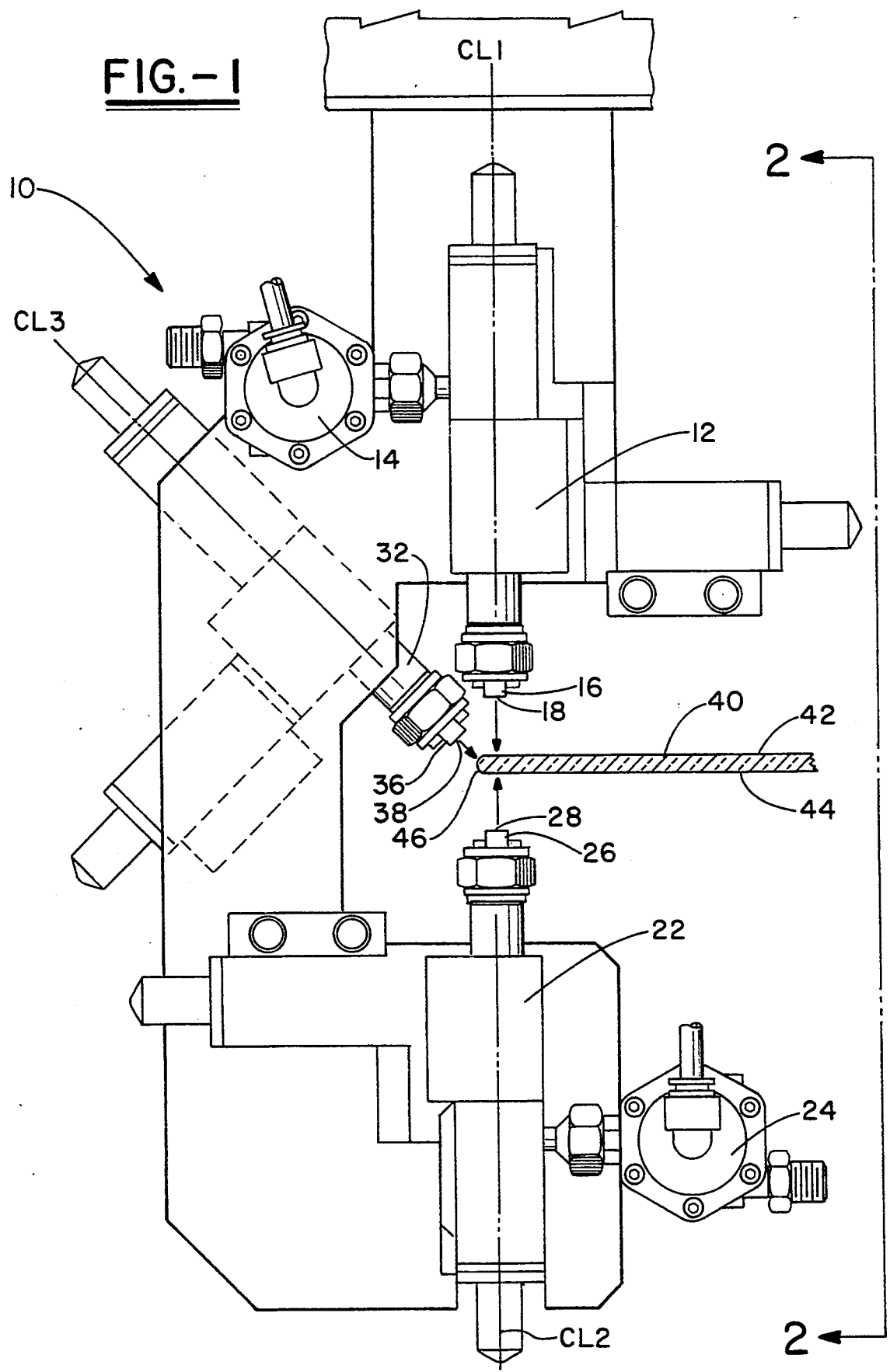
FIG. 1 is a side view of the inventive apparatus according to the invention.

Referring now to FIG. 1, the inventive apparatus 10 comprises a first coating gun 12. The coating gun 12 is operatively associated with a first pressure regulator 14. The first coating gun 12 further comprises a first coating nozzle 16 and a first discharge outlet 18. The pressure regulator 14 controls the pressure of the coating material to the first coating gun 12.

Similarly, the apparatus 10 further comprises a second coating gun 22, a second pressure regulator 24, a second coating nozzle 26, a second discharge outlet 28.

The apparatus 10 may also comprise a third coating gun 32, a third pressure regulator (not shown), a third coating nozzle 36 and a third discharge outlet 38.

In the preferred embodiment, the apparatus 10 is carried by an arm of an industrial robot (not shown), such as for example, the type employed in the assembly of automobiles or other vehicles.

With continuing reference to FIG. 1, the coating guns 12, 22, 32 are arranged around an associated substrate 40. In a common and preferred application, the substrate 40 is a piece of glass, lying generally in a plane, such as a vehicle side glass. In a common and preferred orientation, FIG. 1 shows the substrate 40 in a horizontal orientation, generally parallel to the floor of the vehicle manufacturing or assembly location. In such orientation, relative movement between the substrate 40 and the apparatus 10 causes the substrate 40 to pass between the first and second coating guns 12, 22 and past the third coating gun 32.

The substrate 40 has a first side 42, a second side 44 and a third side 46. The third side 46 forms an edge of the substrate 40 and extends between and perpendicularly to the first side 42 and the second side 44 of the substrate 40. First side 42 and second side 44 are "opposite" of the substrate. For purposes of the disclosure, the first side 42 of the substrate 40 is said to be opposite the second side 44 of the substrate 40 since the first and second sides 42, 44 lie generally in parallel planes and are separated by an edge, namely the third side 46. It is believed the invention is also applicable to substrates which are comprised of other sides which are not "opposite." For example, another substrate might have sides which are "different" but not opposite. By "different", it is meant that the sides of the substrate are not coplanar and may be separated by an edge or a plurality of edges. For example, the invention could be configured to conformally coat edges of nonplanar shaped objects comprising a plurality of different sides.

With reference now to FIGS. 1-4, the first, second, and third coating guns 12, 22, 32 have first, second, and third axes, CL1, CL2, CL3, respectively. As can be most clearly seen in FIG. 2, the axis CL1 of the first coating gun 12 is offset a distance "X" from the axis CL2 of the second coating gun 22. This offset is an important aspect of the invention and is especially advantageous due to the innovative configuration of first and second coating guns 12, 22.

The first and second coating guns 12, 22 are pointed generally toward each other so as to simultaneously discharge a coating material toward opposite sides 42, 44 of a substrate 40. As the substrate 40 moves relative to the first and second coating guns 12, 22, the third side 46, or edge, of the substrate 40 eventually passes from between the first and second coating guns 12, 22. Unless the coating material is accurately and quickly cut off, it is possible that one of the coating guns 12, 22 will dispense a coating of coating material on the other coating gun 12, 22.

Figure 3:
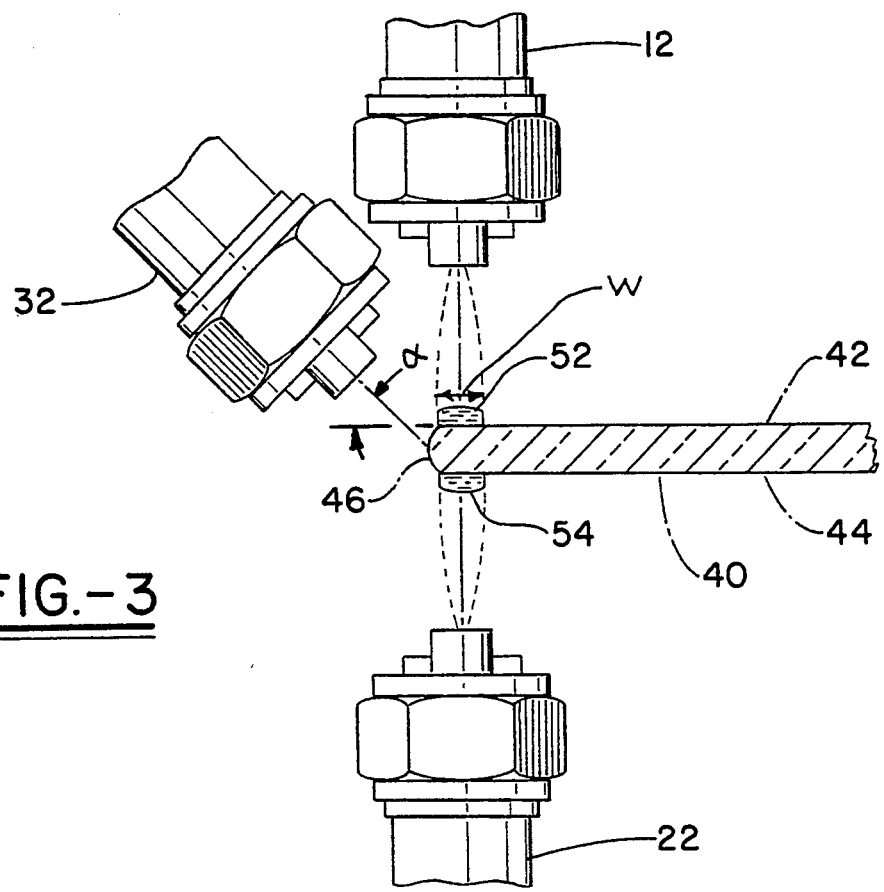
FIG. 3 is an enlarged view of the nozzle portions of the coating guns in FIG. 1.
Figure 4:
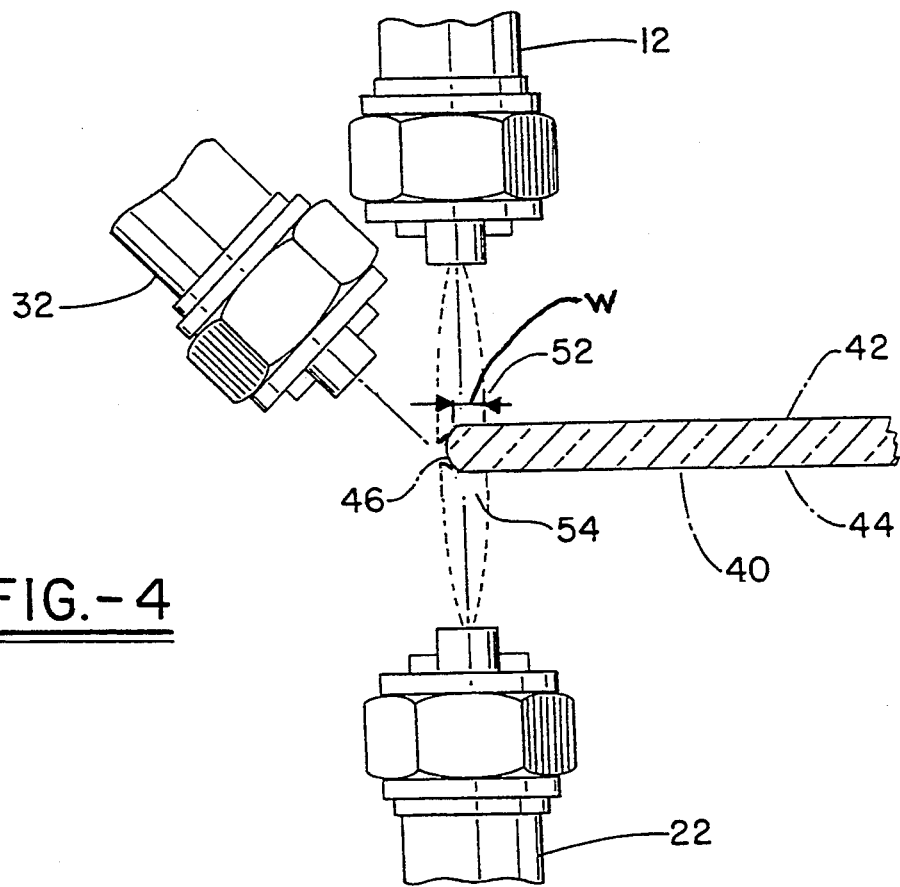
FIG. 4 is an enlarged view of the nozzle portions of the coating guns wherein the first 12 and second 22 coating guns are oriented closer to edge 46 in order to vary the width of the material deposited about the peripheral edge of the first 42 and second 44 sides.

Another commonly occurring situation is that of intentional overspray. In some applications, one or more guns are intentionally aimed so that they discharge over an edge of the substrate. This may be done to vary the width of the coating. For example, first and second coating guns 12, 22 may dispense the coating material to the substrate to produce a coating having a width W, such as indicated in FIG. 3. With reference to FIG. 4, the width W of the material deposited may be decreased by shifting the first and second coating guns toward the edge 46 such that some of the coating material is discharged over or past the edge 46. This not only allows for the width to be varied from part to part, but also provides for the width to vary along the peripheral edge of the glass by causing the robot arm, for example, to move the centerlines CL1, CL2 of the first and second coating guns toward or away from the edge 46. In either of the above-described situations, since the coating material is commonly a primer, sealant, paint, or other material which can harden up, clog, and foul a coating gun 12, 22, it is important that the discharge of one gun does not foul the other gun.

To solve this problem, the inventive apparatus 10 offsets the first coating gun 12 from the second coating gun 22 a distance "X". The distance "X" is measured as the shortest distance between the centerlines CL1, CL2 of the first and second coating guns 12, 22 and is sufficient to ensure that the discharged coating material from the first coating gun 12 does not coat or adversely impair the performance of the second coating gun 22. The distance "X" will vary from application to application, depending on the dispensing pattern of the material to be coated, distance of the coating guns 12, 22 from the substrate 40, and other parameters within the engineering judgement of one skilled in the art. In one preferred embodiment, the distance "X" is equal to about 0.5 inches.

With particular reference to FIG. 3, another important aspect of the invention is provision of third coating gun 32. Third coating gun 32 is aimed at a target area on the third side 46 of the substrate 40. Due to the potential overcoating problem discussed above, it is important that the third spray gun 32 be properly aimed so as to effectively coat the third side 46 of the substrate 40 without fouling the second coating gun 22. The axis CL3 of the third coating gun 32 makes an angle $\alpha$ with the plane containing the substrate 40.

The angle $\alpha$ can be optimized depending on the target area of the third side 46, the location of the other coating guns 12, 22, and other parameters specific to each application. In one particular application, the axis CL3 of the third coating gun 32, and thereby the exact target area of the coating material from the third gun 32, was aimed near the interface of the first side 42 and third side 46 of the substrate 40. This target area was chosen so as minimize overspray off the lower edge of the third side 46, i.e., the interface between the third side 46 and the second side 44. In this particular application, the overspray from the third gun 32 was easily accommodated by the breadth of the target area on the first side 42 of the substrate 40. Therefore, the more critical part of the target area was the lower portion near the interface of the second side 44 and the third side 46. Of course, the optimum target area for the third coating gun 32 will vary depending on the specific application.

With continuing reference to FIG. 3, a first coating of material 52 and a second coating of material 54 have been schematically represented on the first and second sides 42, 44 of the substrate 40. The location, width, thickness and other qualities of these coatings can be adjusted depending on the application. Excellent edge control and thickness control have been obtained with the preferred nozzles 16, 26, 36 available from the Nordson Corporation, 28601 Clemens Rd., Westlake, Ohio, 44145 and sold under the trademark Select Coat ®.

In the preferred embodiment, each of the coating guns 12, 22, 32 is mounted on devices allowing mechanical adjustments of each coating gun 12, 22, 32. In this way, one or two substrates 40 can be coated by the apparatus 10 and the dimensions of the coating material in the target areas 52, 54 measured to make sure the apparatus 10 is operating within specification. Another benefit of such mechanical adjustments is the ease with which the manufacturing line can be adjusted as bead width requirements change from vehicle model year to model year or from one windshield part style to another. It is possible that such adjustments could be automatically controllable based on feedback control loops. The angle $\alpha$ could also be automatically adjustable through a rotatable jig.

In one preferred application of the apparatus, black primer is applied onto a target area near the edge of a vehicle side glass. In this application the distance "X" was about 0.5 inches while the angle $\alpha$ was about 60°. After the side glass has been primed, the molding can be attached to the primed area. This can be accomplished by reaction injection molding (RIM) so that the edge and a portion of the first side, or the second side, or both have the molding attached thereto.

In the preferred embodiment, an airless, non-atomizing conformal coating method is used. In this specification, "conformal coating" means an airless, non-atomizing discharge of a coating material. In such conformal coating method, the discharge outlets 18, 28, 38 of the coating nozzles 16, 26, 36 are configured so that a fan-shaped spray of coating material is applied to the substrate 40 in such a manner so as to prevent the atomization of the coating material.

Figure 2:
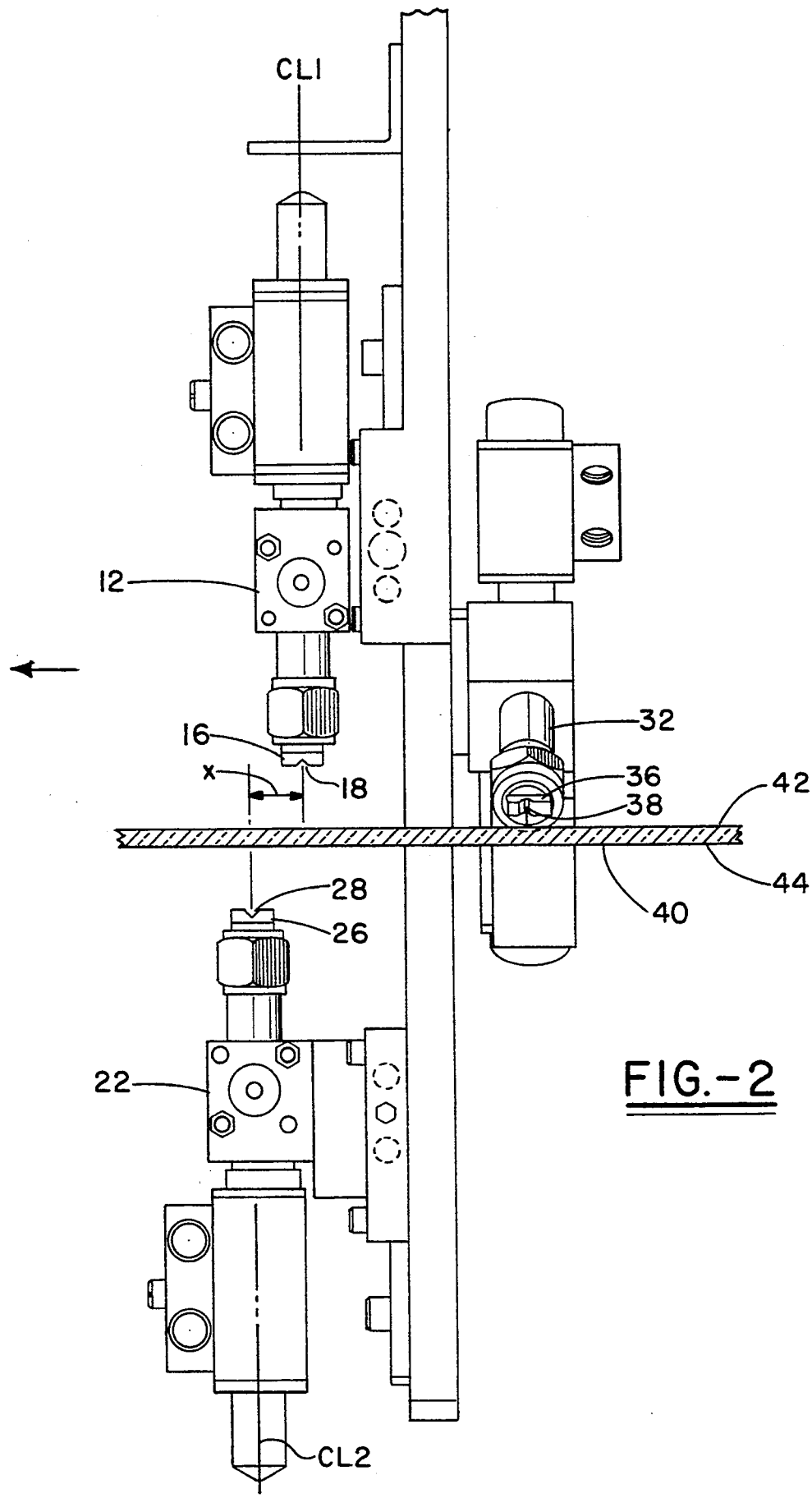
FIG. 2 is a cross-sectional view of the apparatus of FIG. 1, taken along line 2—2.

When coating a peripheral edge of a vehicle windshield, it is readily apparent from FIG. 2 that all three guns can be activated simultaneously as the assembly moves relative to the substrate (indicated by the arrow) and that the second gun 22 will be de-activated first, followed by the first gun 12 and then the third gun 32. Thus the window glass can be coated in one pass as opposed to multiple passes.

The invention has been described with reference to a preferred embodiment. Obviously, modifications and alterations will occur to others upon a reading and understanding of this specification. It is intended to include all such modifications and alterations in so far as they come within the scope of the appended claims or the equivalents thereof.

Having thus described the invention, it is now claimed:

1. A method of simultaneously conformally coating more than one side of a window glass with a coating material, said method comprising:
   supplying a first coating material to a first coating gun, said first coating gun being aimed at a first target area on a first side of said window glass;
   supplying a second coating material to a second coating gun, said second coating gun being aimed at a second target area on a second side of said window glass, said second side of said window glass being opposite said first side of said window glass, an axis of said first gun being offset from an axis of said second dun a distance "X", "X" being the distance between centerlines of said first and second guns;
   supplying a third coating material to a third coating gun, said third coating gun being aimed at a third side of said window glass, said third side of said window glass being between said first and second sides of said window glass, and forming an edge there between and discharging said third coating material from said third coating gun, such that a continuous film of coating material extends from the first target to the second target areas while encompassing the third side of said vehicle window glass;
   controlling a supply pressure of said coating material to said first and second coating guns so that a liquid film emission is discharged from said coating guns, said liquid film emission being substantially free of atomized particles of said coating material; and,
   producing relative movement of said window glass between said first and second coating guns so that said coating material dispensed from said first and second coating guns conformally coats said target areas of said first and second sides of said window glass.

2. A method of simultaneously conformally coating more than one side of a window glass with a coating material, said method comprising:
   supplying a first coating material to a first coating gun, said first coating gun being aimed at a first target area on a first side of said window glass, a width of said first target area varies about a perimeter of said window glass;
   supplying a second coating material to a second coating gun, said second coating gun being aimed at a second target area on a second side of said window glass, said second side of said window glass being opposite said first side of said window glass, an axis of said first gun being offset from an axis of said second gun a distance "X", "X" being the distance between centerlines of said first and second guns;
   controlling a supply pressure of said coating material to said first and second coating guns so that a liquid film emission is discharged from said coating guns, said liquid film emission being substantially free of atomized particles of said coating material; and,
   producing relative movement of said window glass between said first and second coating guns so that said coating material dispensed from said first and second coating guns conformally coats said target areas of said first and second sides of said window glass.

3. The method of claim 2 wherein said width of said first target area is varied over at least a portion of the glass by causing said first coating gun to dispense a portion of said coating material over or past said third side.

4. The method of claim 2 wherein said width of said first target area is varied by causing relative movement between said first coating gun and said window glass transverse to said relative movement of said window glass between said first and second coating guns.

5. A method of simultaneously conformally coating more than one side of a window glass with a coating material, said method comprising:
   supplying a first coating material to a first coating gun, said first coating gun being aimed at a first target area on a first side of said window glass;
   supplying a second coating material to a second coating gun, said second coating gun being aimed at a second target area, said second target area being an edge;
   controlling a supply pressure of said coating material to said first and second coating guns so that a liquid film emission is discharged from said coating guns, said liquid film emission being substantially free of atomized particles of said coating material; and,
   producing relative movement of said window glass between said first and second coating guns so that said coating material dispensed from said first and second coating guns conformally coats said first and second target areas of said window glass.

6. The method of claim 5 wherein said edge makes an angle of about 90 degrees with said first side of said window glass.

7. The method of claim 1 wherein said third coating gun has an axis, said axis of said third coating gun making an angle $\alpha$ with a plane containing said window glass, said third coating gun being aimed at a third target area on said third side of said associated window glass.

8. The method of claim 1 wherein said third coating gun is aimed so that coating material from said third coating gun does not coat said first or second coating guns.

9. A method of simultaneously conformally coating more than one side of a window glass with a coating material, said method comprising:
   supplying a first coating material to a first coating gun, said first coating gun being aimed at a first target area on a first side of said window glass;
   supplying a second coating material to a second coating gun, said second coating gun being aimed at a second target area on a second side of said window glass, said second side of said window glass being opposite said first side of said window glass;

controlling a supply pressure of said coating material to said first and second coating guns so that a liquid film emission is discharged from said coating guns, said liquid film emission being substantially free of atomized particles of said coating material;

producing relative movement of said window glass between said first and second coating guns so that said coating material dispensed from said first and second coating guns conformally coats said target areas of said first and second sides of said window glass; and, causing said first gun to be aimed to overspray an edge of said associated window glass in order to vary a width of said first target area about a perimeter of said window glass.

* * * * *

UNITED STATES PATENT AND TRADEMARK OFFICE
CERTIFICATE OF CORRECTION

PATENT NO. : 5,360,645
DATED : November 1, 1994
INVENTOR(S) : James E. DeVries

It is certified that error appears in the above-identified patent and that said Letters Patent is hereby corrected as shown below:

Column 7, line 34, "dun" should be --gun--.

Signed and Sealed this

Twenty-sixth Day of March, 1996

Attest:

BRUCE LEHMAN

Attesting Officer     Commissioner of Patents and Trademarks